(No Model.)

D. W. CLARKE.
NECK YOKE.

No. 353,441. Patented Nov. 30, 1886.

WITNESSES
C. H. Raeder.
Thos. E. Robertson.

INVENTOR
David W. Clarke
By T. J. W. Robertson
Attorney

UNITED STATES PATENT OFFICE.

DAVID W. CLARKE, OF TIDIOUTE, PENNSYLVANIA.

NECK-YOKE.

SPECIFICATION forming part of Letters Patent No. 353,441, dated November 30, 1886.

Application filed April 15, 1886. Serial No. 198,942. (No model.)

*To all whom it may concern:*

Be it known that I, DAVID W. CLARKE, a citizen of the United States, residing at Tidioute, in the county of Warren and State of Pennsylvania, have invented certain new and useful Improvements in Neck-Yokes and Whiffletrees, of which the following is a specification, reference being had therein to the accompanying drawings, in which—

Figure 1:
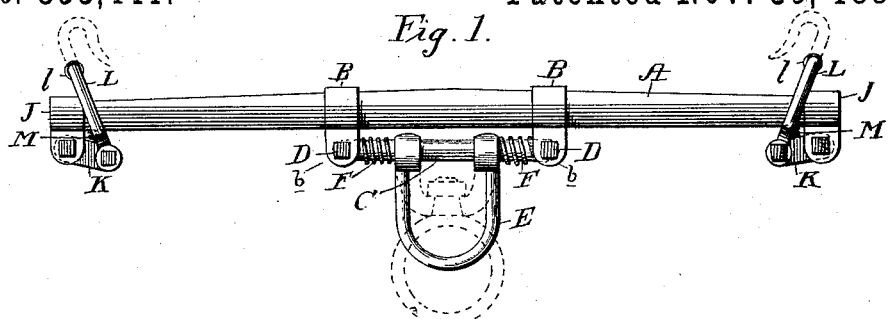
Figure 2:
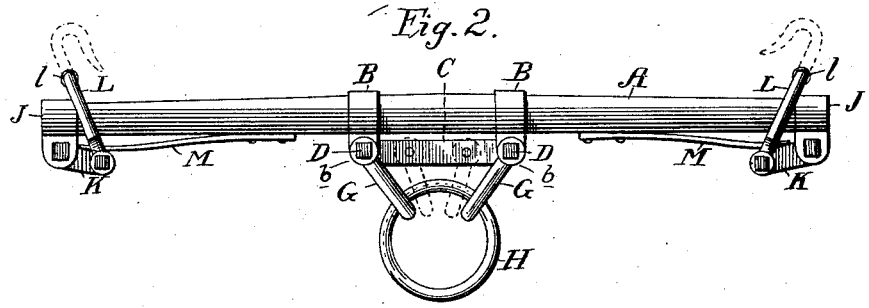
Figure 3:
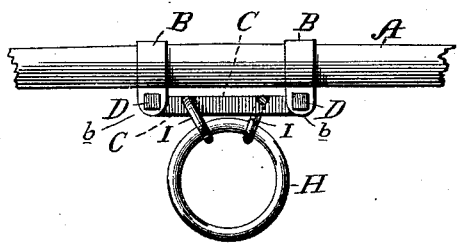
Figure 4:
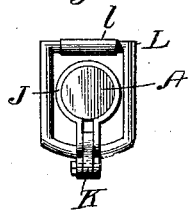

Figure 1 is front elevation of a neck-yoke constructed according to my improvement. Fig. 2 is a similar view of a modification. Fig. 3 is a similar view of another modification of the central part of the neck-yoke, and Fig. 4 is an end view of one end of the neck-yoke shown in Fig. 1.

This improvement relates more particularly to the irons of neck-yokes, whiffletrees, &c.; and it consists in the peculiar construction, arrangement, and combinations of parts hereinafter described, and then more particularly pointed out in the claims.

Referring now to the details of the drawings, A represents the bar of a neck-yoke or whiffletree, as the case may be, around which are secured two clips, B B, which are connected by a short bar, C, fastened to the clips by bolts D, each of which passes through one end of the bar and through the ears $b$ of a clip, and thus the bar C is securely fastened to the clips and the clips to the main bar. In the construction shown in Fig. 1, the bar is preferably round, and carries a U-shaped loop, E, and on each side of the loop is a spiral spring, F, by means of which the loop may move slightly in a lateral direction, and yet always return automatically to its normal or central position.

Instead of the loop E, I may employ a swiveled ring, as shown by dotted lines in Fig. 1, which I should consider an equivalent for said loop.

Instead of the spring-connection shown in Fig. 1, I sometimes propose to use the swinging connection shown in Figs. 2 and 3. In the former there are two clips, G G, used to connect the pole-ring H with the bar-clips B B. These clips G G may either be secured by the same bolts as secure the clips B to the bar A, as shown in full lines in Fig. 2, or they may be secured direct to bar C by other bolts or pins, as shown by dotted lines in the same figure.

In the plan adopted in Fig. 3, the bar C may be provided with notches in which rings I I, instead of the clasps C C, are used, and these rings carry the large pole-ring, as shown.

The end irons consist of a clip, J, provided with a short link, K, whose free end carries a loop or hook, L. If a loop is used it is preferably made square at one end, as shown in Fig. 4, and provided with a tube, $l$, to take the wear off of the strap which connects it with the harness when in use. If made in the form of a hook, as shown in dotted lines in Fig. 1, the tube may of course be dispensed with. To relieve the horses from strains, I generally employ a spring, M, which may be either a spiral spring, as shown in Fig. 1, or a flat spring, as shown in Fig. 2. I have shown these devices as attached to a neck-yoke; but it is obvious that the irons may be used for whiffletrees, if desired.

Instead of the clips shown at B or J, I may sometimes employ a tube or ferrules with ears cast on it or them to receive the bar C or the link K, and should consider such tube or ferrules as equivalents for my clips in the following claims.

It will be observed that in all the forms shown the connection between the ring and bar is such as to allow of the former moving sidewise and then automatically returning to the center. This is caused by the springs in the form shown in Fig. 1, and by the strain when the horses pull on the bar A in the forms shown in Figs. 2 and 3, as owing to the clips G or rings I being set at an angle to the center of the draft, the strain of the horses tends to keep the pole ring or loop central. These clips G and rings I are therefore to a considerable extent the equivalents of the springs F in Fig. 1; but I prefer the springs, as they are much more sure in their action.

What I claim as new is—

1. The combination, with the bar A, of the clips B, having ears $b$, the cross-bar C, and the bolts D, passing through said ears and bar, and the latter supporting the pole-connection, substantially as described.

2. The combination, with the bar A, of the clips B B, the bar C, and a spring sliding connection between the carriage-pole and the bar C, substantially as described.

3. The combination, with the bar A, of the clips B B, bar C, loop E, and springs F F, substantially as described.

4. The combination, with the bar A, of the clip J, link K, loop or hook L, and a spring, M, substantially as described.

5. The combination, with the bar A, of the clip J, link K, and the loop or hook L, substantially as described.

6. The combination, with the clips D, the cross-bar C, held by bolts passing through said clips, and a sidewise-moving pole-connection, as the loop E or ring H, of a laterally-moving connection between bar C and said pole loop or ring, substantially as described.

In testimony whereof I affix my signature in presence of two witnesses.

DAVID W. CLARKE.

Witnesses:
E. M. CURTIS,
GEO. J. SMUTZ.